C. K. ALDRICH.
AUTOMOBILE BED.
APPLICATION FILED APR. 21, 1917.
1,291,704.
Patented Jan. 21, 1919.
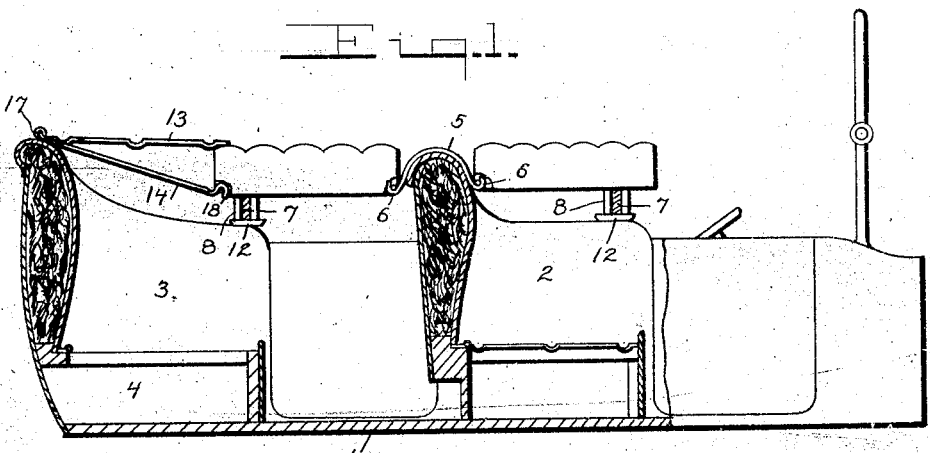
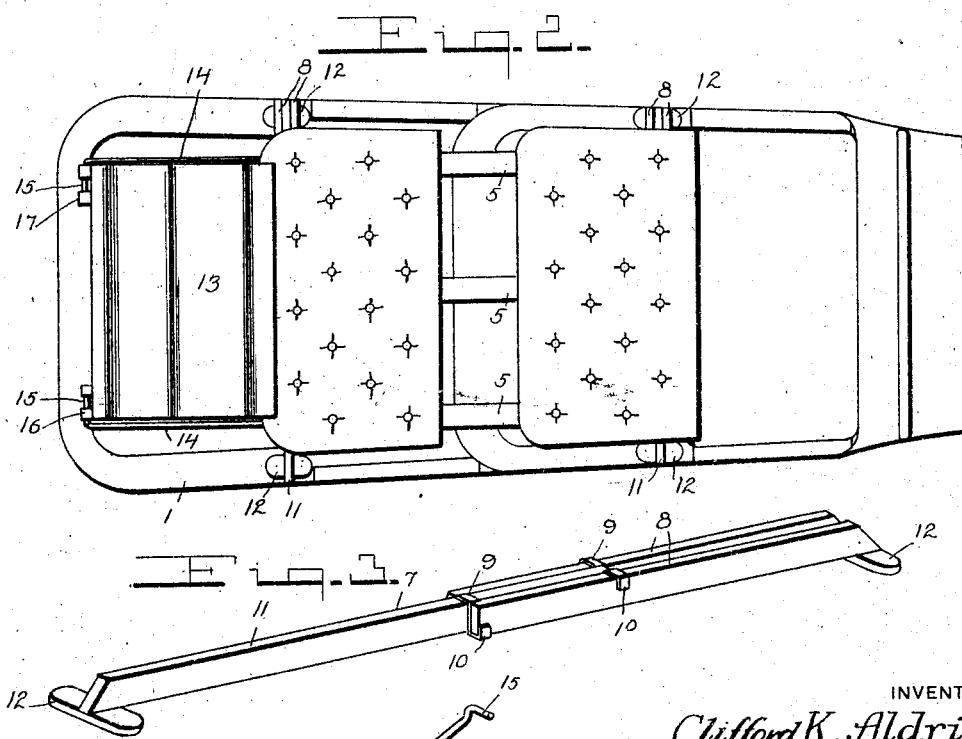
WITNESSES
INVENTOR
Clifford K. Aldrich
BY
ATTORNEY

UNITED STATES PATENT OFFICE.

CLIFFORD K. ALDRICH, OF SACRAMENTO, CALIFORNIA.

AUTOMOBILE-BED.

1,291,704.　　　　　Specification of Letters Patent.　　Patented Jan. 21, 1919.

Application filed April 21, 1917. Serial No. 163,643.

*To all whom it may concern:*

Be it known that I, CLIFFORD K. ALDRICH, a citizen of the United States, residing at Sacramento, in the county of Sacramento and State of California, have invented certain new and useful Improvements in Automobile-Beds, of which the following is a specification.

This invention relates to new and useful improvements in automobiles and the principal object of the invention is to provide means for converting an automobile into a bed.

Another object of the invention is to provide means whereby the cushions of the automobile may be utilized as part of the bed and also the rear locker lid may be utilized as a part of the bed.

Another object of the invention is to make the parts necessary to support the cushions and locker lid few in number and telescopic where necessary, so said extra parts will occupy the minimum amount of space in the automobile.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:

Figure 1 is a longitudinal section through an automobile, with the parts in position to form the bed.

Fig. 2 is a plan view.

Fig. 3 is a perspective view of one of the supporting members.

Fig. 4 is a view of one of the supporting rods.

In these figures, 1 indicates the body of an automobile provided with the usual front seat 2 and rear seat 3, 4 indicating the locker under the rear seat. In carrying out my invention I provide a number of loops 5, three being shown in the drawings. These loops are preferably formed of spring metal and have their ends turned up, as at 6. These loops are adapted to be placed over the top of the back of the front seat and the turned-up ends are to engage with the edges of the cushions, as shown in Fig. 1. To support the other edges of the cushions I provide two telescopic members 7, each of said members consisting of a pair of bars 8 spaced apart by two U-shaped members 9, said members having their ends extended and bent to grip the two bars, as at 10, said members being reversely arranged to form a slide between the two bars 8 to receive a third bar 11 so said bar 11 can slide between the two bars 8 to shorten the member. Each of said members 7 is provided with a block 12 at each end to rest on the sides of the seats. As is shown in the drawings, these members extend across the automobile from one side of the seat to the other and are located a short distance from the front of the seats.

To bridge the space between the back of the rear seat and the rear cushion, I utilize the lid 13 of the rear locker 4 and I place this lid with its front edge resting on the rear cushion and its rear edge resting on the back of the rear seat and this lid is held in this position by means of a pair of rods 14 having one end bent at 15 to pass through the sockets 16 of the hinge members 17 on the lid. The other end of each rod 14 is provided with a hook 18 for engaging the edge of the cushion, the fabric of the cushion being cut in the rear to expose a part of the frame thereof with which the hooks engage.

It will be seen that the cushions and lid are firmly and securely supported on the automobile and that when covered with any suitable form of mattress, such, for instance, as the well known sanitary pad used on cots, a comfortable bed is provided with room enough for two people. It will be seen that the tops of the cushions are substantially on a line with the top of the front seat, so that the bed will fill up this space without causing any unevenness in the bed.

Due to the collapsible feature of the members 11 and the small amount of room taken up by the loops 5 and the pair of rods 14, the extra parts can be easily carried in the automobile without taking up much room therein.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. In combination with an automobile, of means for supporting the cushions thereof in front and rear of the back of the front seat, a member adapted for engagement with the rear cushion and the back of the rear seat, sockets carried by said member, and rods having hooks thereon adapted for engagement with the sockets on said member and the rear cushion.

2. In combination with an automobile of means for supporting the cushions thereof in front and rear of the back of the front seat so the top of said back is flush with the cushions and means for bridging the space between the rear cushion and the back of the rear seat.

3. An automobile bed comprising bars extending across the seats and resting on the sides thereof adjacent the front of the seats for supporting the cushions of the automobile, means resting on the top of the back of the front seat for engaging the cushions and means for bridging the space between the back of the rear seat and the rear cushion.

4. An automobile bed comprising bars extending across the seats near the front thereof and resting on the sides for supporting the cushions, loops placed over the top of the back of the front seat for engaging with the edges of the cushions and means for supporting the locker lid with one edge resting on the rear cushion and its other edge on the back of the rear seat.

5. An automobile bed comprising a pair of members for extending across the automobile seats, means for making said members telescopic, loops engaging the top of the front seat for engaging the cushions of the automobile, said cushions resting on the said members and means for supporting the locker lid between the rear cushion and the back of the rear seat.

6. An automobile bed comprising a plurality of cushions, a pair of members for extending across the automobile seat, each member including a pair of bars arranged in spaced relation, a pair of U-shaped members having their ends bent to grip the said bars and being reversely arranged thereupon to form a slide between said bars, a bar adapted to slide between said spaced bars, cushions adapted to have one end thereof supported by said members, and means for supporting their other ends.

7. An automobile bed including cushions arranged in the front and rear of the back of the front seat, means for supporting their other ends, and loops having their free ends adapted to engage the adjacent ends of the cushions and said loops adapted to be supported by the back of the front seat.

In testimony whereof I affix my signature in presence of two witnesses.

CLIFFORD K. ALDRICH.

Witnesses:
HENRY W. PETERSON,
ARTHUR J. HURLEY.